US011736532B2

(12) United States Patent
Rogers et al.

(10) Patent No.: US 11,736,532 B2
(45) Date of Patent: Aug. 22, 2023

(54) AUTOMATING DIGITAL FORENSIC EVIDENCE COLLECTION

(71) Applicant: Purdue Research Foundation, West Lafayette, IN (US)

(72) Inventors: Marcus Kent Rogers, West Lafayette, IN (US); Fahad Esaam Salamh, Kokomo, IN (US); Umit Karabiyik, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 8 days.

(21) Appl. No.: 17/006,154

(22) Filed: Aug. 28, 2020

(65) Prior Publication Data

US 2021/0067563 A1 Mar. 4, 2021

Related U.S. Application Data

(60) Provisional application No. 62/894,764, filed on Aug. 31, 2019.

(51) Int. Cl.
| | |
|---|---|
| H04L 29/00 | (2006.01) |
| H04L 9/40 | (2022.01) |
| G06N 3/04 | (2023.01) |
| G06V 20/20 | (2022.01) |
| G06V 10/764 | (2022.01) |
| G06V 10/82 | (2022.01) |
| G06V 10/40 | (2022.01) |

(52) U.S. Cl.
CPC ............. *H04L 63/306* (2013.01); *G06N 3/04* (2013.01); *G06V 10/40* (2022.01); *G06V 10/764* (2022.01); *G06V 10/82* (2022.01); *G06V 20/20* (2022.01); *H04L 63/1416* (2013.01); *H04L 63/302* (2013.01); *H04L 63/308* (2013.01)

(58) Field of Classification Search
CPC . H04L 63/302; H04L 63/1416; H04L 63/306; G06V 20/20
USPC ........................................................ 726/26
See application file for complete search history.

(56) References Cited

U.S. PATENT DOCUMENTS

| | | | |
|---|---|---|---|
| 10,025,950 B1* | 7/2018 | Avasarala | G06V 10/82 |
| 2019/0020905 A1* | 1/2019 | Bennett | H04N 5/77 |

OTHER PUBLICATIONS

Statista, "Number of registered Dropbox users from Apr. 2011 to Mar. 2016 (in millions)," Mar. 2016, available at www.statista.com/statistics/261820/Number-of-registered-dropbox-users/ (2 pages).

(Continued)

*Primary Examiner* — Brandon Hoffman
*Assistant Examiner* — Michael D Anderson
(74) *Attorney, Agent, or Firm* — Maginot, Moore & Beck LLP

(57) ABSTRACT

A system for automatic collection and analysis of digital forensic evidence by a cloud service provider is disclosed. The system utilizes machine learning models to identify and store digital forensic evidence relating to cybercrimes committed using a cloud service. Particularly, if an image or video file uploaded to the cloud service provider is determined to relate to illicit, illegal, or malicious activity, relevant digital forensic evidence is extracted and stored for later provision to law enforcement. The digital forensic evidence that is collected may be used to assist law enforcement in their investigations of criminal activity, as well as aid in the successful prosecution of criminals in court proceedings.

15 Claims, 4 Drawing Sheets

(56) References Cited

OTHER PUBLICATIONS

Finney, J., "Microsoft by the numbers: A look into how many people are using Microsoft's products and services," OnMSFT, Nov. 2014, available at www.onmsft.com/news/microsoft-numbers-look-how-many-people-are-using-microsofts-products-and-services (3 pages).

Wodinsky, S., "Google Drive is about to hit 1 billions users," The Verge, Jul. 2018, available at www.theverge.com/2018/7/25/17613442/google-drive-one-billion-users (2 pages).

Ayers, R. et al., "Guidelines on Mobile Device Forensics," NIST Special Publication 800-101, Revision 1, National Institute of Standards of Technology (NIST), U.S. Department of Commerce, May 2014 (85 pages).

Amirullah, A. et al., "Forensics Analysis from Cloud Storage Client Application on Proprietary Operating System," International Journal of Computer Applications, Jun. 2016, vol. 143, No. 1, 1-7 (8 pages).

Daryabar, F. et al., "Forensic investigation of OneDrive, Box, GoogleDrive and Dropbox applications on Android and iOS devices," Australian Journal of Forensic Sciences, vol. 48, No. 6, 615-642 (28 pages).

Quick, D. et al., "Dropbox analysis: Data remnants on user machines," Digital Investigation, 2013, vol. 10, 3-18 (16 pages).

Quick, D. et al., "Digital droplets: Microsoft SkyDrive forensic data remnants," Future Generation Computer Systems, 2013, vol. 29, 1378-1394 (17 pages).

Chung, H. et al., "Digital Forensic Investigation of Cloud Storage Services," Digital Investigation, 2012, vol. 9, No. 2, 81-95 (20 pages).

Almulla, S. et al., "A State-of-the-Art Review of Cloud Forensics," Journal of Digital Forensics, Security and Law, 2014, vol. 9, No. 4, 7-28 (22 pages).

Aditya, K. et al., "Enabling Trust in Deep Learning Models: A Digital Forensics Case Study," 17th IEEE International Conference on Trust, Security, and Privacy in Computing and Communications/ 12th IEEE International Conference on Big Data Science and Engineering (TrustCom/BigDataSE), arXiv:1808.01196v1 [cs.CR] Aug. 3, 2018 (6 pages).

Rao, Y. et al., "A Deep Learning Approach to Detection of Splicing and Copy-Move Forgeries in Images," IEEE International Workshop on Information Forensics and Security (WIFS), 2016 (6 pages).

He, K. et al., "Deep Residual Learning for Image Recognition," IEEE Conference on Computer Vision and Pattern Recognition, arXiv:1512.03385v1 [cs.CV] Dec. 10, 2015 (12 pages).

Krizhevsky, A. et al., "ImageNet Classification with Deep Neural Networks," in Proceedings of 25th International Conference on Neural Information Processing Systems, vol. 1, 2012 (9 pages).

Lopes, A. P. B. et al., "A Bag-of-Features Approach Based on Hue-Sift Descriptor for Nude Detection," 17th European Signal Processing Conference (EUSIPCO 2009), Aug. 2009, 1552-1556 (5 pages).

Zheng, Y. et al., "Breast Cancer Screening Using Convolutional Neural Network and Follow-up Digital Mammography," Computational Imaging III, International Society for Optics and Photonics, 2018, vol. 10669, 1066905 (13 pages).

Statista, "Cloud Computing—Statistics & Facts," available at www.statista.com/topics/1695/cloud-computing/ (last accessed Feb. 10, 2021) (4 pages).

Statista, "Distribution of global cloud and non-cloud mobile data traffic from 2014 to 2019," available at www.statista.com/statistics/292840/distribution-global-cloud-and-non-cloud-traffic/ (last accessed Feb. 10, 2021) (2 pages).

* cited by examiner

AUTOMATING DIGITAL FORENSIC EVIDENCE COLLECTION

This application claims the benefit of priority of U.S. provisional application Ser. No. 62/894,764, filed on Aug. 31, 2019 the disclosure of which is herein incorporated by reference in its entirety.

FIELD

The device and method disclosed in this document relates to digital forensics and, more particularly, to automating digital forensic evidence collection.

BACKGROUND

Unless otherwise indicated herein, the materials described in this section are not admitted be the prior art by inclusion in this section.

In today's computing environment, it's not just companies that are migrating to the cloud. There is also an increase in the adoption of cloud services among individual users. This increase in private usage increases the potential for cybercrimes through Software as a Service (SaaS) cloud applications on mobile devices. In particular, cyber criminals have come to understand the complexity of the cloud virtualization environment and the difficulty in collecting evidence to trace the location of suspicious activities. Thus, this growth in the adoption of cloud services challenges digital forensic investigations, particularly related to crimes such as child exploitation, drugs, and firearms trading. What is needed is a system or method for automating the collection of digital forensic evidence relating to cybercrimes committed using cloud services. It would be advantageous if such a system or method could also automate the forensic reporting process between law enforcement and cloud service providers.

SUMMARY

A method for processing an image by a backend system is disclosed. The backend system has at least one server that is in communication with a plurality of client devices and is configured to provide at least one service to the plurality of client devices. The method comprises receiving, with the backend system, an image from a first client device of the plurality of client devices. The method further comprises determining, with a processor of the backend system, a feature vector representing the image using a convolutional neural network. The method further comprises determining, with the processor, whether the image belongs to a first class of images based on the feature vector using a support vector machine. The method further comprises storing, in a storage device of the backend system, the image and data relating to the image, in response to the image being determined to belong to the first class.

A backend system for a cloud service provider is disclosed. The backend system includes at least one storage device configured to store data. The backend system further includes at least one server that is in communication with a plurality of client devices and is configured to provide at least one service to the plurality of client devices. The at least one server has a processor configured to: receive an image from a first client device of the plurality of client devices; determine a feature vector representing the image using a convolutional neural network; determine whether the image belongs to a first class of images based on the feature vector using a support vector machine; an operate the at least one storage device to store the image and data relating to the image, in response to the image being determined to belong to the first class.

A non-transitory computer-readable medium for processing an image by a backend system is disclosed. The backend system further includes at least one server that is in communication with a plurality of client devices and is configured to provide at least one service to the plurality of client devices. The computer-readable medium stores program instructions that, when executed by a processor, cause the processor to: receive an image from a first client device of the plurality of client devices; determine a feature vector representing the image using a convolutional neural network; determine whether the image belongs to a first class of images based on the feature vector using a support vector machine; and operate a storage device of the backend system to store the image and data relating to the image, in response to the image being determined to belong to the first class.

BRIEF DESCRIPTION OF THE DRAWINGS

The foregoing aspects and other features of method and system are explained in the following description, taken in connection with the accompanying drawings.

DETAILED DESCRIPTION

Figure 1:
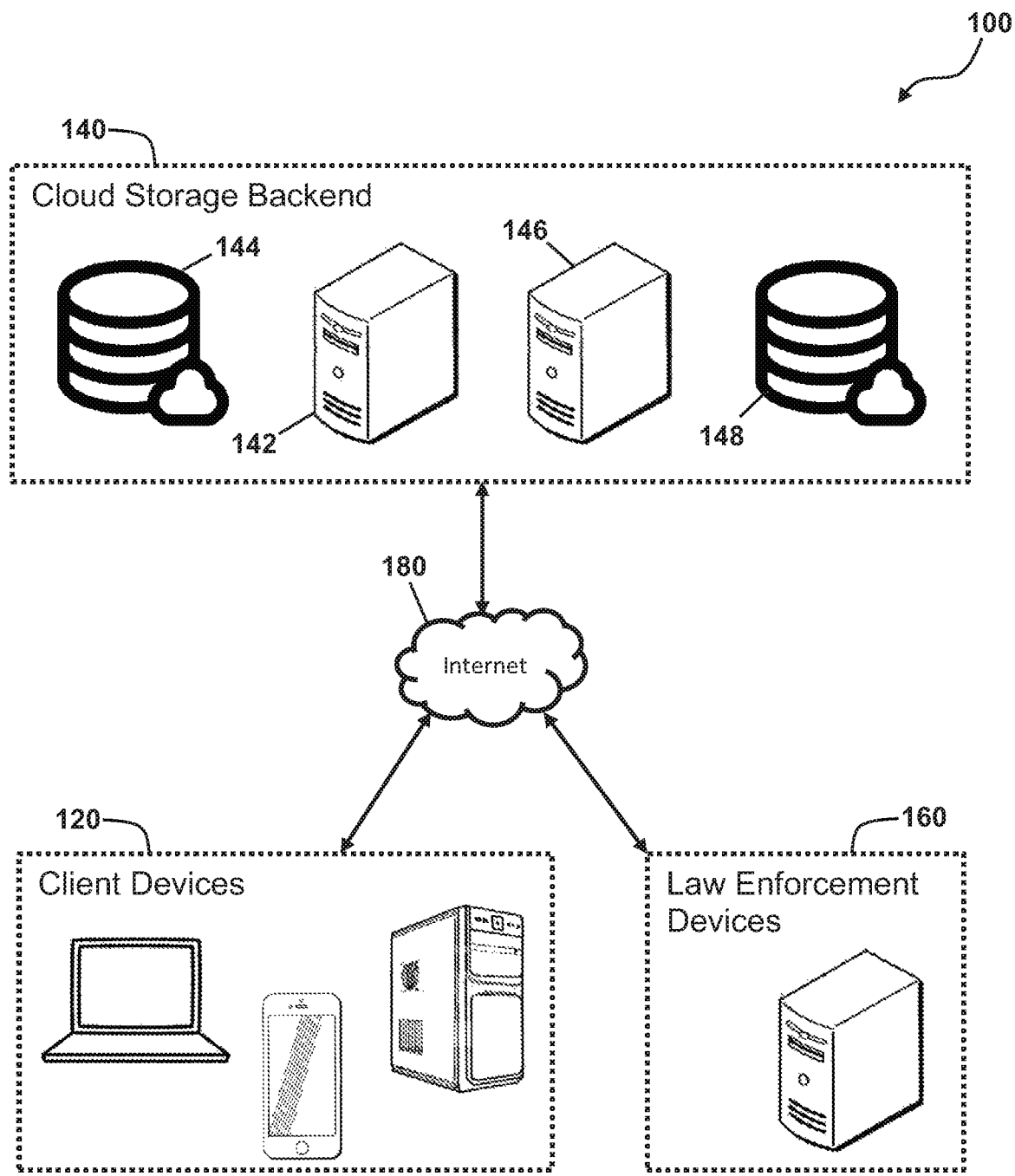
FIG. 1 shows a system for automatic collection and analysis of digital forensic evidence by a cloud service provider.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

FIG. 1 shows a system 100 for automatic collection and analysis of digital forensic evidence by a cloud service provider. The system 100 advantageously utilizes machine learning models to identify and store digital forensic evidence relating to cybercrimes committed using a cloud service. In particular, the system 100 utilizes a machine learning model to scan image or video files uploaded to a cloud service provider and detect if the image or video files may relate to an illicit, illegal, or malicious activity. Examples of such activities include child exploitation, illegal drug trafficking, and firearms trafficking. If an image or video file is determined to relate to illicit, illegal, or malicious activity, relevant digital forensic evidence is extracted and stored for later provision to law enforcement. Particularly, the digital forensic evidence that is collected may be used to assist law enforcement in their investigations of criminal activity, as well as aid in the successful prosecution of criminals in court proceedings. In this way, digital forensic evidence that is likely to be sought after by law enforcement is automatically stored but, conversely, equivalent information relating to mundane activities using the cloud service provider is not permanently stored. Thus, the system 100 advantageously minimizes the amount of storage space required for storing digital forensic evidence. Moreover, the system 100 advantageously minimizes the amount of digital forensic evidence that must be processed by law enforcement, thereby reducing backlog and increasing the speed of investigations.

The system 100 will be described herein primarily with respect to a cloud service provider that provides a cloud data storage service. Non-limiting examples of such services include "Drop Box," "Google Drive," "Box," "Amazon Drive," and "One Drive." However, it should be appreciated that the system 100 is equally applicable to any cloud service provider in which image or video files might be received from a client device, including a variety of Infrastructure as a Service (IaaS) providers, Platform as a Service (PaaS) providers, and Software as a Service (SaaS) providers.

In the illustrated embodiment of FIG. 1, the system 100 comprises one or more client devices 120, a cloud storage backend 140, and one or more law enforcement devices 160, which communicate with one another via the Internet 180. The client devices 120 may comprise a variety of different personal electronic devices, such as laptop computer, desktop computers, tablet computers, smart phones, or smart watches. The client devices 120 are configured to interact with the cloud storage backend 140 using a cloud storage application or equivalent web interface, via which the client devices 120 may upload an image file or video file for storage or processing by the cloud storage backend 140.

The cloud storage backend 140 may comprise a plurality of different servers and storage devices. In the illustrated embodiment, the cloud storage backend 140 includes one or more cloud storage servers 142 configured to manage data received from the client devices 120 and stored in one or more cloud storage devices 144. Additionally, the cloud storage backend 140 includes one or more forensic servers 146 configured to scan image or video files uploaded to the cloud storage backend 140 and detect if the image or video files may relate to an illicit, illegal, or malicious activity. If an image or video file is determined to relate to illicit, illegal, or malicious activity, the forensic servers 146 extract relevant digital forensic evidence and store it in one or more forensic storage devices 148. It should be appreciated that, depending on the features provided by the cloud service provider, the cloud storage backend 120 may include a variety of additional servers, including web servers or application servers for providing additional features.

The relevant digital forensic evidence that is collected by forensic servers 146 may be provided the law enforcement devices 160 on a proactive basis or responsive to a compelling legal order, such as a cloud search warrant. Particularly, as images and videos are flagged as possibly being related to illicit, illegal, or malicious activity, the forensic servers 146 may transmit some or all of the collected digital forensic evidence to one or more of the law enforcement devices 160. Moreover, if a compelling legal order is received, the forensic servers 146 may execute a search of the digital forensic evidence stored on the forensic storage devices 148 according to the parameters of the compelling legal order, which may for example identify a particular user account, time period, time stamp, IP address, or similar information defining the scope of the warrant.

Exemplary Hardware Embodiments

Figure 2:
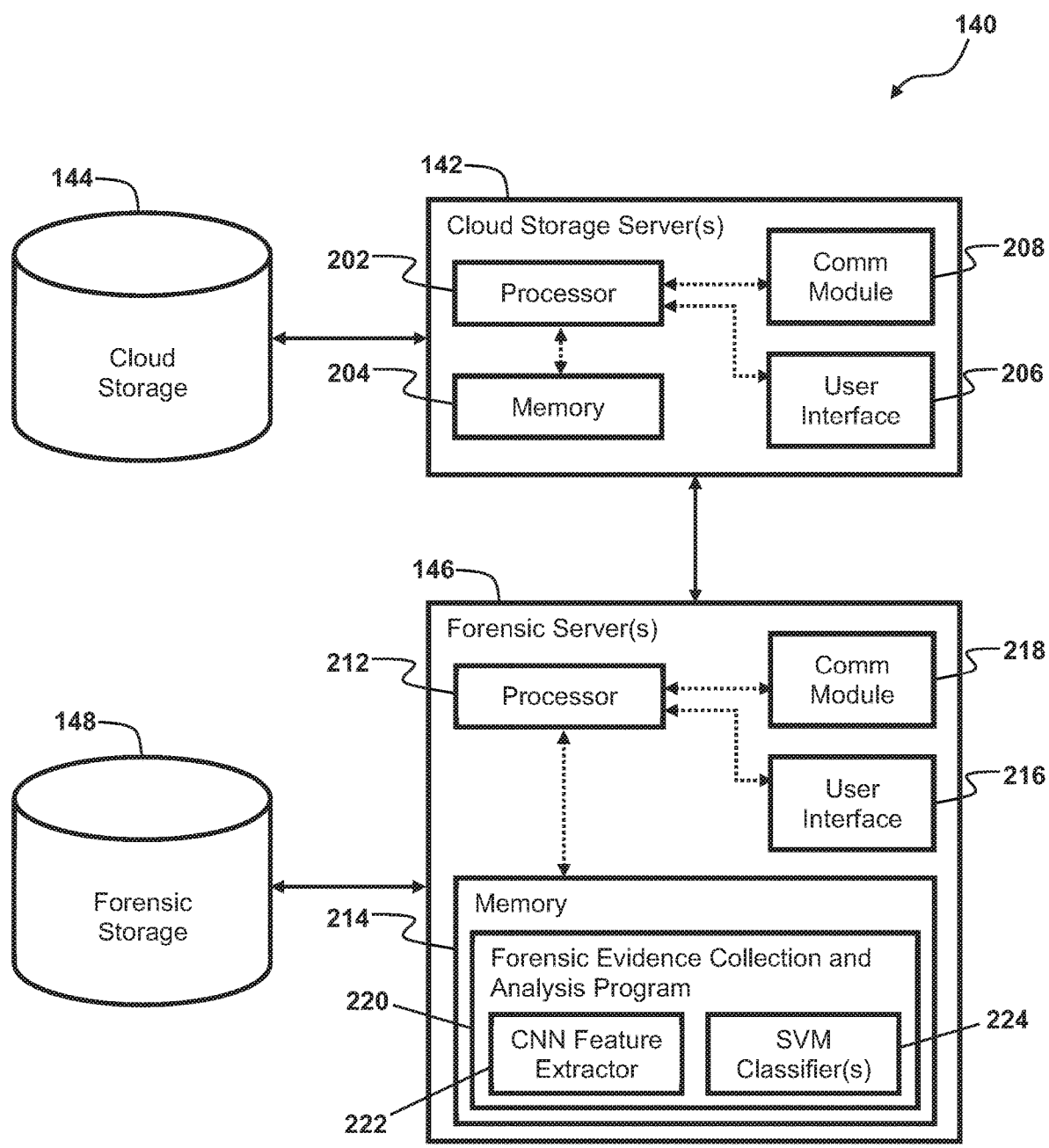
FIG. 2 shows exemplary components of the cloud storage backend of FIG. 1.

With reference to FIG. 2, exemplary components of the cloud storage backend 140 are described. In the illustrated embodiment, each of the cloud storage servers 142 includes, for example, a processor 202, a memory 204, a user interface 206, and a network communications module 208. Likewise, each of the forensic servers 146 includes, for example, a processor 212, a memory 214, a user interface 216, and a network communications module 218. It should be appreciated that the illustrated embodiments of the cloud storage servers 142 and of the forensic servers 146 are only exemplary embodiments of such servers and are merely representative of any of various manners or configurations of a personal computer, server, or any other data processing systems that are operative in the manner set forth herein.

The processors 202, 212 are configured to execute instructions to operate the respective servers 142, 146 to enable the features, functionality, characteristics and/or the like as described herein. To this end, the processors 202, 212 are operably connected to the respective memory 204, 214, the respective user interface 206, 216, and the respective network communications module 208, 218. The processors 202, 212 generally each comprise one or more processors which may operate in parallel or otherwise in concert with one another. It will be recognized by those of ordinary skill in the art that a "processor" includes any hardware system, hardware mechanism or hardware component that processes data, signals or other information. Accordingly, the processors 202, 212 may include systems with a central processing unit, graphics processing units, multiple processing units, dedicated circuitry for achieving functionality, programmable logic, or other processing systems.

The cloud storage devices 144 and forensic storage devices 148 may be of any type of long-term non-volatile storage device capable of storing information accessible by the processors 202, 212 of the servers 142, 146, such as hard drives or any of various other computer-readable storage media recognized by those of ordinary skill in the art. Likewise, the memories 204, 214 are configured to store program instructions that, when executed by the respective processor 202, 212, enable the servers 142, 146 to perform various operations described herein. The memories 204, 214 may be of any type of device or combination of devices capable of storing information accessible by the respective processor 202, 212, such as memory cards, ROM, RAM, hard drives, discs, flash memory, or any of various other computer-readable media recognized by those of ordinary skill in the art.

The network communications modules 208, 218 of the servers 142, 146 enable communication with any of various devices, at least including the other servers of the cloud storage backend 140, the client devices 120, and the law enforcement devices 160. In particular, the network communications modules 208, 218 may include local area network ports and corresponding network adapters that allow for communication with any of various local computers housed in the same or nearby facility. In some embodiments, the servers 142, 146 communicate with the Internet via a separate modem and/or router of the local area network. Alternatively, the network communications modules 208, 218 further include wide area network ports and corresponding modems that allow for communications with remote computers over the Internet. In one embodiment, the network communications modules 208, 218 are equipped with Wi-Fi transceivers or other wireless communications devices. Accordingly, it should be appreciated that communications with the servers 142, 146 may occur via wired communications or via the wireless communications. Communications may be accomplished using any of various known communications protocols.

The servers 142, 146 may be operated locally or remotely by an administrator. To facilitate local operation, the servers 142, 146 may include user interfaces 206, 216. In at least one embodiment, the user interfaces 206, 216 may suitably include LCD display screens or the like, mice or other pointing devices, keyboards or other keypads, speakers, and microphones, as will be recognized by those of ordinary skill in the art. Alternatively, in some embodiments, an administrator may operate the servers 142, 146 remotely from another computing device which is in communication therewith via the respective network communications module 208, 218 and has an analogous user interface.

The program instructions stored on the memory 214 of the forensic servers 146 includes a forensic evidence collection and analysis program 220. As discussed in further detail below, the processor 212 is configured to execute the forensic evidence collection and analysis program 220 to scan image or video files uploaded to the cloud storage backend 140 and detect if the image or video files may relate to an illicit, illegal, or malicious activity. To this end, the forensic evidence collection and analysis program 220 utilizes a machine learning model comprised of a convolution neural network (CNN) feature extractor 222 configured to extract features from received image or video files and includes one or more support vector machine (SVM) classifiers configured to classifier the received image or video files based on the extracted feature vector.

Machine Learning Model

Figure 3:
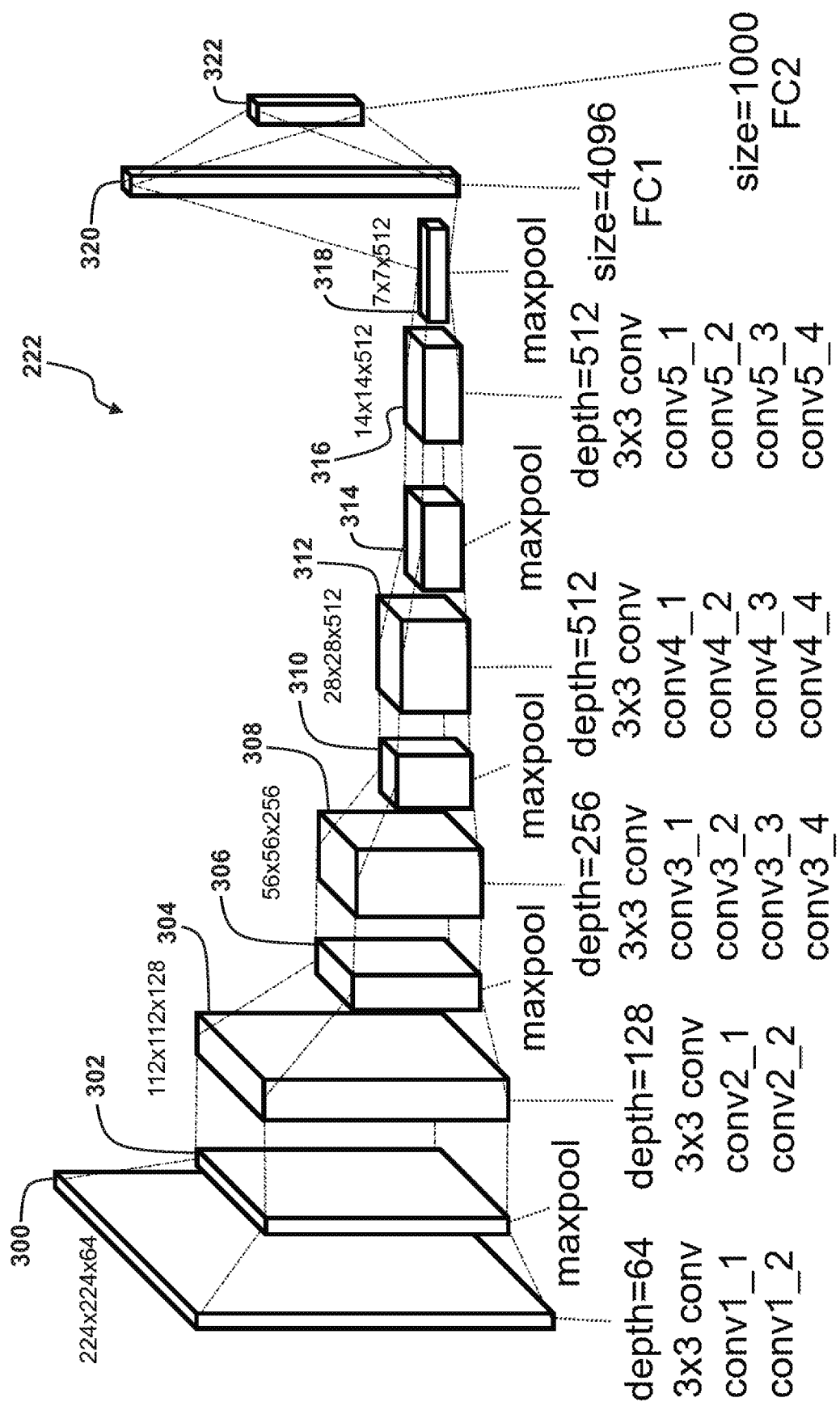
FIG. 3 shows a logical flow diagram illustrating the operations of a CNN feature extractor of a forensic evidence collection and analysis program.

FIG. 3 shows a logical flow diagram illustrating the operations of CNN feature extractor 222 of the forensic evidence collection and analysis program 220. The processor 212 of the forensic server 146 is configured to execute program instructions corresponding to the CNN feature extractor 222 to determine a feature vector that represents features of a received input image. Particularly, the CNN feature extractor 222 is configured to receive two-dimensional input images having predetermined height and width such that the input to the CNN feature extractor 222 has predetermined dimensions equal to height×width (e.g., 224×224). The input image may, for example, be an image that was uploaded to the cloud storage backend 140 or thumbnail from a video that was uploaded to the cloud storage backend 140, which has been resized and/or cropped to the predetermined dimensions (e.g., 224×224). In some embodiments, the input images may be split into a predetermined number of channels (e.g., Red, Green, Blue), such that the predetermined dimensions of input to the CNN feature extractor 222 has predetermined dimensions equal to height×width×channels (e.g., 224×224×3).

It will be appreciated by those of ordinary skill in the art that a convolutional neural networks (CNNs) are a type of feed-forward neural network that contains a number of convolution layers or convolution operations. A convolution layer receives an input, and applies one or more convolutional filters to the input. A convolutional filter, also referred to as a kernel, is a matrix of weights, also referred to as parameters or filter values, which is applied to various chunks of an input matrix in a defined manner such that the matrix of weights is convolved over the input matrix to provide an output matrix. Values for the matrix of weights are learned in a training process prior to operation of the CNN. The dimensions of the output matrix is determined by the kernel size of the filter (i.e., the size of the matrix of weights) and by the "stride" of the filter, which indicates how much the chunks of the input matrix overlap with one another during convolution or are spaced apart from one another during convolution. The various layers and filters of a CNN are used to detect various "features" of the input.

In the exemplary illustrated embodiment, the CNN feature extractor 222 includes a first group of convolution layers 300, a second group of convolution layers 304, a third group of convolution layers 308, a fourth group of convolution layers 312, and a fifth group of convolution layers 316. Each group of convolution layers has one or more convolution layers that each performs a convolution operation with a predetermined filter size and predetermined depth. Particularly, in the illustrated embodiment the first group of convolution layers 300 has two convolution layers conv1_1 and conv1_2, each of which performs 3×3 convolutions with a depth of 64. The second group of convolution layers 304 has two convolution layers conv2_1 and conv2_2, each of which performs 3×3 convolutions with a depth of 128. The third group of convolution layers 308 has four convolution layers conv3_1, conv3_2, conv3_3, and conv3_4, each of which performs 3×3 convolutions with a depth of 256. The fourth group of convolution layers 312 has four convolution layers conv4_1, conv4_2, conv4_3, and conv4_4, each of which performs 3×3 convolutions with a depth of 512. Finally, the fifth group of convolution layers 312 has four convolution layers conv5_1, conv5_2, conv5_3, and conv5_4, each of which performs 3×3 convolutions with a depth of 512. In at least one embodiment, Rectified Linear Unit (ReLU) activation is applied to the output of each convolution layer (not shown).

In the exemplary illustrated embodiment, the CNN feature extractor 222 includes a first pooling layer 302, a second pooling layer 306, a third pooling layer 310, a fourth pooling layer 314, and a fifth pooling layer 318. Each pooling layer 302, 306, 310, 314, and 318 follows a corresponding one of the convolution layers 300, 304, 308, 312, and 316 and is configured to subsample the output of the respective convolution layer 300, 304, 308, 312, and 316 with a predetermined filter size and/or window size (e.g., 2×2) applied predetermined stride (e.g., 2) to reduce the dimensionality of the respective output by a corresponding factor (e.g., 2). It will be appreciated by those of ordinary skill in the art that pooling reduces output dimensionality while keeping the most salient information and provides an output matrix having a fixed size. In the illustrated embodiment, the pooling layers 302, 306, 310, 314, and 318 are max pooling layers, but other pooling techniques may be applied such as average pooling.

For the purpose of providing a feature vector, the output of the fifth pooling layer 318 is provided to a pair of fully connected layers 320 and 323 each having a predetermined number of neurons. Particularly, in one embodiment, the first fully connected layer 320 has first predetermined dimensions (e.g., 1×4096), and the second fully connected layer 322 has second predetermined dimensions (e.g., 1×1000) that are reduced compared to that of the first fully connected layer 320. In one embodiment, further fully connected layers are provided. In one embodiment, the fully connected layers 320 and 322 are each followed by ReLU activation of the output (not shown). In one embodiment, further fully connected layers are provided. The output the final fully connected layer, i.e., the second fully connected layer 322, is the determined feature vector for the input image and has the dimensions final fully connected layer (e.g., 1×1000).

In some embodiments, the CNN feature extractor 222 may further include one or more dropout layers (not shown) applied after various layers and configured to dropout a random set (e.g., 50%) of activations. Additionally, in some embodiments, batch normalization, L1/L2 regularization, or the like (not shown) may be applied after various layers.

The learnable parameters of the CNN feature extractor 222, in particular the kernels of each convolution filter of the convolution layers and the weights of each fully connected layer, are learned during a training process prior to operation of the system 100. During training, a plurality of images, such as those of the ImageNet data set, which are labeled with one of a 1000 different class/feature labels are provided to the CNN feature extractor 222. Generally, the kernel values of the convolutional filters and weights of the fully connected layer are learned and/or optimized, using the plurality of images, over one or more epochs by minimizing a loss function.

The extracted feature vector is provided to the SVM classifier(s) 224 in order to determine whether the input image relates to one of a plurality of classes relating to an illicit, illegal, or malicious activity. Such classes may, for example, include child exploitation, illegal drug trafficking, and firearms trafficking. However, the SVM classifier(s) 224 may be configured to detect images corresponding to any number of additional classes relating to an illicit, illegal, or malicious activity.

It will be appreciated by those of ordinary skill in the art that support vector machines (SVMs) are a type of machine learning model in which a decision surface or hyperplane is used to classify data as corresponding to one or the other of two possible classes. In particular, during training of an SVM, a decision surface or hyperplane is determined that maximizes a margin between the decision surface or hyperplane and the training data points around the decision surface or hyperplane. The training data points that are closest to the decision surface or hyperplane are referred to as the "support vectors." After training, the decision surface or hyperplane is embodied as a set of weights $w_i$, generally one for each dimension or feature of the input data, and a bias term b which can be used to predict a classification of new input vectors.

The SVM classifier(s) 224 may include an individual SVM for each class of the plurality of classes relating to an illicit, illegal, or malicious activity, each configured to perform a binary classification, i.e., does the image belong to the class or not. In other words, the each SVM classifier is configured as a 'one-versus-rest' or 'one-versus-all' binary classifier. However, it should be appreciated that a set of 'one-versus-one' binary classifiers can be equivalently utilized in some circumstances.

In one embodiment, the SVM classifiers 224 include a first SVM classifier configured to determine whether the input image relates to child exploitation, a second SVM classifier configured to determine whether the input image relates to illegal drug trafficking, and a third SVM classifier configured to determine whether the input image relates to firearms trafficking. As noted above, each individual SVM classifier is embodied by a bias term b and a set of weights $w_i$ defining a respective decision surface or hyperplane, which are applied to the input feature vector to determine an output class prediction.

The learnable parameters of the SVM classifiers 224, in particular the set of weights $w_i$ and the bias term b that define the decision surface or hyperplane for each SVM classifier, are learned during a training process prior to operation of the system 100. During training, a plurality of images which are labeled as corresponding to the particular class or not corresponding to the particular class are used to derive the set of weights $w_i$ and the bias term b that define the decision surface or hyperplane. Generally, the values that define the decision surface or hyperplane are derived using to an optimization process that maximizes the margin around the decision surface or hyperplane.

Method for Automatic Forensic Evidence Collection

Figure 4:
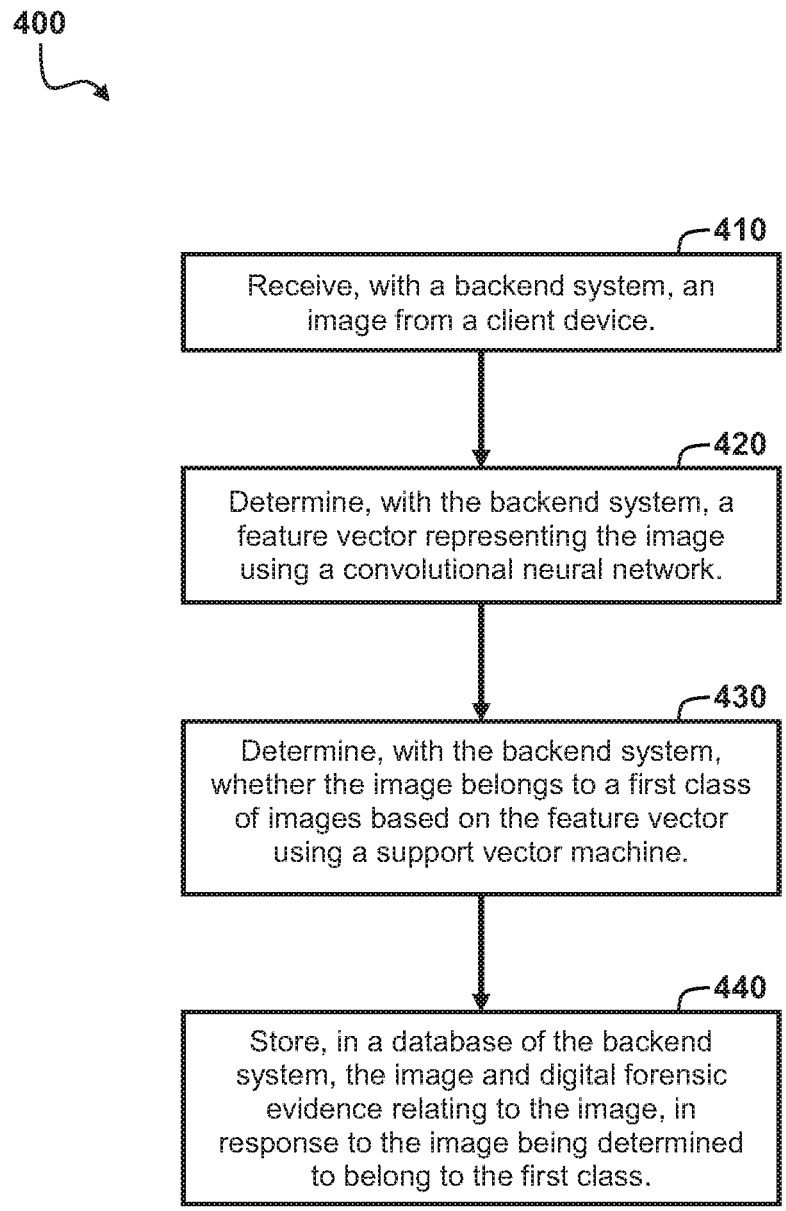
FIG. 4 shows a flow diagram for a method for automatically collect forensic evidence relating to images and videos received from client devices.

FIG. 4 shows a flow diagram for a method 400 for operating the cloud storage backend 140 of the system 100 to automatically collect forensic evidence relating to images and videos received from the client devices 120. In the description of these method, statements that some task, calculation, or function is performed refers to a processor (e.g., the processor 212 of the forensic server(s) 146 or the processor 202 of the cloud storage server(s) 142) executing programmed instructions (e.g., the forensic evidence collection and analysis program 220) stored in non-transitory computer readable storage media (e.g., the memory 214 of the forensic server(s) 146 or the memory 204 of the cloud storage server(s) 142) operatively connected to the processor to manipulate data or to operate one or more components of the forensic server(s) 146 to perform the task or function. Additionally, the steps of the methods may be performed in any feasible chronological order, regardless of the order shown in the figures or the order in which the steps are described.

The method 400 begins with a step of receiving, with a backend system, an image from a client device (block 410). Particularly, a client device 120 transmits an image or video file to the cloud storage backend 140, for example for the purpose of being stored in the cloud storage devices 144 or for some other processing at the cloud storage backend 140. In some embodiments, the processor 202 of the cloud storage server 142 operates the network communications module 208 to receive the image or video file from the client device 120 and then forward the image or video file to the forensic server 146. The processor 212 of the forensic server 146 operates the network communications module 218 to receive the image or video file from the cloud storage server 142. Alternatively, in some embodiments, the forensic server 146 instead receives the image or video file directly from the client device 120 and similarly forwards the image or video file to the cloud storage server 142.

In some embodiments, the forensic server 146 performs some initial preprocessing of the image or video file. Particularly, in the case of an image file, the processor 212 resizes and/or crops the image of the image file to generate an input image having predetermined dimensions (e.g., 224×224). In the case of a video file, the processor 212 extracts at least one thumbnail image from the video file and, then, resizes and/or crops the at least one thumbnail image to generate at least one input image having predetermined dimensions (e.g., 224×224).

The method 400 continues with a step of determining, with the backend system, a feature vector representing the image using a convolutional neural network (block 420). Particularly, for each input image, the processor 212 executes program instructions of the CNN feature extractor 222 to determine a feature vector representing the input image. As discussed above, the CNN feature extractor 222 includes a series of convolution layers, max pooling layers, and fully connected layers having learned parameters that were previously learning in a training process. The processor 212 performs the operations of each layer of the CNN feature extractor 222 with reference to the learned parameters to arrive at the feature vector representing the input image. The feature vector representing the input image has predetermined dimensions corresponding to those of the final fully connected layer of the CNN feature extractor 222 (e.g., 1×1000).

The method 400 continues with a step of determining, with the backend system, whether the image belongs to a first class of images based on the feature vector using a support vector machine (block 430). Particularly, for each feature vector, the processor 212 executes program instructions of the SVM classifier(s) 224 to determine whether the input image that is represented by the feature vector belongs to one of the plurality of classes relating to an illicit, illegal, or malicious activity. As discussed above, the SVM classifier(s) 224 may include an individual SVM classifier for each class of the plurality of classes relating to an illicit, illegal, or malicious activity, each configured to perform a binary classification. Accordingly, for each class in the plurality of classes, the processor 212 executes program instructions of the respective SVM classifier to determine whether the input image belongs to the respective class. In each case, the processor 212 determines whether the input image belongs to the respective class using the decision surface or hyperplane of the respective SVM classifier or, more particularly, the bias term b and the set of weights $w_i$ that define the decision surface or hyperplane of the respective SVM classifier.

In one embodiment, the processor 212 executes program instructions of a first SVM classifier to determine whether the input image relates to child exploitation. In one embodiment, the processor 212 executes program instructions of a second SVM classifier to determine whether the input image relates to illegal drug trafficking. In one embodiment, the processor 212 executes program instructions of a third SVM classifier to determine whether the input image relates to firearms trafficking.

The method 400 continues with storing, in a database of the backend system, the image and digital forensic evidence relating to the image, in response to the image being determined to belong to the first class (block 440). Particularly, in response to the input image belonging to one of the plurality of classes relating to an illicit, illegal, or malicious activity, the processor 212 stores the originally received the image or video file in a database on the forensic storage devices 148. Additionally, in response to the input image belonging to one of the plurality of classes relating to an illicit, illegal, or malicious activity, the processor 212 collects digital forensic evidence relating to the originally received the image or video file and stores the digital forensic evidence in association with the image or video file in the database on the forensic storage devices 148, for example in the form of a log.

In one embodiment, the digital forensic evidence relating to the image or video file includes information regarding the user account associated with the upload of the image or video file to the cloud storage backend 140. Particularly, the processor 212 identifies a user account associated with the client device 120 from which the image was received. Information regarding the user account is stored in the database of the forensic storage devices 148 in association with the respective image or video file. The information regarding the user account may include, for example, a username, an email address, a home address, a phone number, a first name, a last name, a middle name, or an account number. Moreover, the information may further include various cache files or other temporary files associated with the user account, particular at the time of the upload of the respective image or video file to the cloud storage backend 140.

In one embodiment, the digital forensic evidence relating to the image or video file includes information regarding the circumstances of the upload of the image or video file to the cloud storage backend 140. Particularly, the processor 212 identifies information such as a timestamp at which the image or video file was received from the first client device, an IP address from which the image or video file was received from the first client device, and an original file location of the image or video file in a memory of the client device 120. This information regarding the circumstances of the upload is stored in the database of the forensic storage devices 148 in association with the respective image or video file.

In one embodiment, the digital forensic evidence relating to the image or video file includes metadata stored with the image or video file. Particularly, the processor 212 extracts metadata from the image or video file and stores the extracted metadata in the database of the forensic storage devices 148 in association with the respective image or video file. In some embodiments, the metadata includes information regarding the circumstances of the original capture or generation of the image or video file. For example, the extracted metadata may include a timestamp at which the image or video file was captured, a location at which the image or video file was captured, a type of device (e.g., make or model) with which the image or video file was captured, and an application, software versions, and/or codec with which the image or video file was captured or generated.

In some embodiments, after collecting the digital forensic evidence, some or all of the digital forensic evidence and the image or video file itself can be proactively provided to law enforcement. Particularly, the processor 212 operates the network communications module 218 to transmit an alert message to one of the law enforcement devices 160. The alert message includes some or all of the digital forensic evidence and may include the image or video file itself.

In some embodiments, the digital forensic evidence and/or the image or video file itself can be provided to law enforcement responsive to a compelling legal order, such as a cloud search warrant. Particularly, the processor 212 operates the network communications module 218 to receive a request message from a law enforcement device 160, which specifies at least one parameter of a search to be performed. The processor 212 performs a search of the digital forensic evidence stored in the database of the forensic storage devices 148 to identify any data relating to at least one parameter of the search to be performed. The at least one parameter of the search to be performed may, for example, specify a particular user account, a particular time period, a particular IP address, or the like, which can be used to filter or narrow down the digital forensic evidence that is relevant to the search. After the search is performed, the processor 212 operates the network communications module 218 to transmit a message including some or all of the identified digital forensic evidence relating to at least one parameter of the search, including the associated images or videos.

In some embodiments, in response to the input image belonging to one of the plurality of classes relating to an illicit, illegal, or malicious activity, the processor 212 causes the associated user account to be banned from the cloud service provider and/or from the future provision of cloud services by the cloud storage backend 140. Particularly, this may for example be achieved by deleting the user account from a registry of authorized users or adding the user account to a blacklist.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for processing an image by a backend system, the backend system having at least one server that is in communication with a plurality of client devices and being configured to provide at least one service to the plurality of client devices, the method comprising:
   receiving, with the backend system, an image from a first client device of the plurality of client devices;
   determining, with a processor of the backend system, a feature vector representing the image using a convolutional neural network;
   determining, with the processor, whether the image belongs to one of a plurality of classes of images based on the feature vector using a plurality of support vector machines, each respective support vector machine in the plurality of support vector machines corresponding to a respective class in the plurality of classes and being configured to compare the feature vector with a respective decision surface to classify the image as belonging to the respective class;
   storing, in a storage device of the backend system, the image and data relating to the image, in response to the image being determined to belong to any of the plurality of classes, the storage device storing a plurality of images belonging to the plurality of classes and data relating to the plurality of images;
   receiving, with the backend system, from a law enforcement device, a request message defining a search to be performed, the request message specifying at least one parameter;
   performing, with the processor, a search of the storage device to identify at least one image that belongs to any of the plurality of classes and relates to the at least one parameter; and
   transmitting, with the backend system, the identified at least one image and the data relating to identified at least one image to the law enforcement device.

2. The method of claim 1 further comprising:
   at least one of resizing and cropping the image to have predetermined dimensions.

3. The method of claim 1, the receiving the image further comprising:
   receiving, with the backend system, a video from a first client device of the plurality of client devices; and
   extracting, with the processor, the image from the video.

4. The method of claim 1 further comprising:
   transmitting, with the backend system, at least one of the image and the data relating to the image to a law enforcement device.

5. The method of claim 1 further comprising:
   identifying, with the processor, a user account associated with the first client device from which the image was received, wherein the stored data relating to the image includes information regarding the user account.

6. The method according to claim 5 further comprising:
   banning, with the processor, the user account from future provision of services by the backend system in response to the image being determined to belong to the first class.

7. The method of claim 1 further comprising:
   identifying, with the processor, at least one of (i) a timestamp at which the image was received from the first client device, (ii) an IP address from which the image was received from the first client device, and (iii) a file location of the image in a memory of the first client device,
   wherein the stored data relating to the image includes the at least one of (i) the timestamp, (ii) the IP address, and (iii) the file location.

8. The method of claim 1 further comprising:
   extracting, with the processor, metadata from the image, wherein the stored data relating to the image includes the extracted metadata.

9. The method according to claim 8, wherein the extracted metadata includes at least one of (i) a timestamp at which the image was captured, (ii) a location at which the image was captured, (iii) a type of device with which the image was captured, and (iv) an application with which the image was captured.

10. The method according to claim 1, wherein the first class of images is images relating to at least one criminal activity.

11. The method according to claim 10, wherein the first class of images is images relating to at least one of child exploitation, illegal drug trafficking, and illegal firearm trafficking.

12. The method of claim 1, wherein the backend system is configured to provide a cloud storage service to the at least one client device.

13. A backend system for a cloud service provider, the backend system comprising:
    at least one storage device configured to store data; and
    at least one server that is in communication with a plurality of client devices and being configured to provide at least one service to the plurality of client devices, the at least one server having a processor configured to:
    receive an image from a first client device of the plurality of client devices;
    determine a feature vector representing the image using a convolutional neural network;
    determine whether the image belongs to one of a plurality of classes of images based on the feature vector using a plurality of support vector machines, each respective support vector machine in the plurality of support vector machines corresponding to a respective class in the plurality of classes and being configured to compare the feature vector with a respective decision surface to classify the image as belonging to the respective class;
    operate the at least one storage device to store the image and data relating to the image, in response to the image being determined to belong to any of the plurality of classes, the storage device storing a plurality of images belonging to the plurality of classes and data relating to the plurality of images;
    receive, from a law enforcement device, a request message defining a search to be performed, the request message specifying at least one parameter;
    perform a search of the storage device to identify at least one image that belongs to any of the plurality of classes and relates to the at least one parameter; and
    transmit, to the law enforcement device, the identified at least one image and the data relating to identified at least one image.

14. A non-transitory computer-readable medium for processing an image by a backend system, the backend system having at least one server that is in communication with a plurality of client devices and being configured to provide at least one service to the plurality of client devices, the computer-readable medium storing program instructions that, when executed by a processor, cause the processor to:
receive an image from a first client device of the plurality of client devices;
determine a feature vector representing the image using a convolutional neural network;
determine whether the image belongs to one of a plurality of classes of images based on the feature vector using a plurality of support vector machines, each respective support vector machine in the plurality of support vector machines corresponding to a respective class in the plurality of classes and being configured to compare the feature vector with a respective decision surface to classify the image as belonging to the respective class;
operate a storage device of the backend system to store the image and data relating to the image, in response to the image being determined to belong to any of the plurality of classes, the storage device storing a plurality of images belonging to the plurality of classes and data relating to the plurality of images;
receive, from a law enforcement device, a request message defining a search to be performed, the request message specifying at least one parameter;
perform a search of the storage device to identify at least one image that belongs to any of the plurality of classes and relates to the at least one parameter; and
transmit, to the law enforcement device, the identified at least one image and the data relating to identified at least one image.

15. The method according to claim 1, wherein the respective decision surface of each support vector machine in the plurality of support vector machines is characterized by a respective plurality of weights and a respective bias term, each the respective plurality of weights corresponding to a different dimension of the feature vector.

* * * * *